Jan. 12, 1954

B. E. STONE

CONTROL MECHANISM FOR EQUIPMENT FOR HANDLING ELONGATED RECORDS 2,665,855

Filed May 3, 1948

2 Sheets-Sheet 1

Inventor
Burnham E. Stone

By

Lynnestvedt & Lechner
Attorneys

Jan. 12, 1954

B. E. STONE

CONTROL MECHANISM FOR EQUIPMENT FOR HANDLING ELONGATED RECORDS 2,665,855

Filed May 3, 1948

2 Sheets-Sheet 2

Inventor

Burnham E. Stone

By

Synnestvedt & Lechner

Attorneys

Patented Jan. 12, 1954

2,665,855

UNITED STATES PATENT OFFICE 2,665,855

CONTROL MECHANISM FOR EQUIPMENT FOR HANDLING ELONGATED RECORDS

Burnham E. Stone, Philadelphia, Pa., assignor to The International Electronics Company, Philadelphia, Pa., a corporation of Pennsylvania Application May 3, 1948, Serial No. 24,716

16 Claims. (Cl. 242—54)

This invention relates to equipment for use with elongated records and is especially concerned with control mechanism for such equipment. The invention is particularly useful in equipment of the type adapted to handle elongated magnetic records and comprising a pair of record reels between which an elongated record is adapated to be fed.

A machine of the type to which the invention is especially adapted is disclosed in copending application of Daniel H. Dashiell and Lloyd J. Bobb, Serial No. 11,995, filed February 28, 1948, now Patent No. 2,585,724. As there disclosed, such a machine is adapted for use with elongated magnetic tape records, for instance a paper tape carrying a coating in which finely divided particles of magnetizable material are dispersed. In such a machine, as disclosed in said copending application, a pair of tape reels are provided and drive and control mechanism serve to alternatively feed the tape record in either direction between reels.

In a machine of the character referred to the record is adapted to be scanned either for recording or for reproduction by means of a magnetic scanning head positioned adjacent the path of feed of the record between the reels. The scanning head is shiftable transversely of the tape record so as to provide for scanning of different tracks when the tape is fed in opposite directions. Provision is also made for changing the speed of feed of a record in either direction between the reels, the machine including a control having one position of adjustment in which the feed conforms with the normal scanning speed desired for recording or for playback and another position of adjustment in which the tape is fed at a high speed, for purposes of rewind and the like.

In a machine of the general organization briefly described above, if the control for changing the speed of feed is set in the high speed position and is then adjusted to the low speed position, the momentum of the tape reel from which the tape is being delivered will cause this reel to continue spinning at relatively high speed and thereby discharge a substantial loop of the tape, since at this time the speed of the take-up reel is greatly reduced. Such an occurrence is objectionable as it may result in entangling of the record.

The principal object of the present invention is to provide against such undesirable development of a free loop of the record. For this purpose the equipment of the present invention includes control mechanism operative to prevent adjustment of the speed control (i. e., the control for changing the speed of tape feed) from high speed setting to low or scanning speed setting, except when the tape feed is stopped.

How the foregoing and other objects and advantages are attained will appear more fully from the following description referring to the accompanying drawings, in which—

Figure 1:
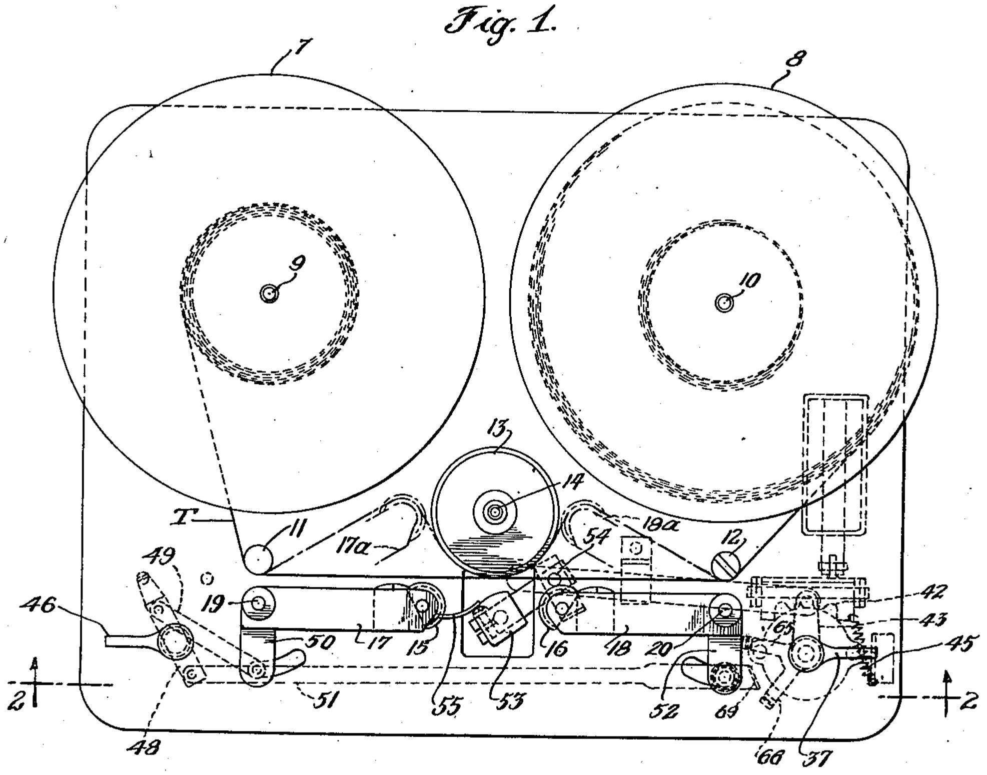
Figure 1 is a plan view of a machine adapted for use with elongated magnetic tape records of the character above referred to, this machine incorporating the improved control mechanism of the present invention.
Figure 2:
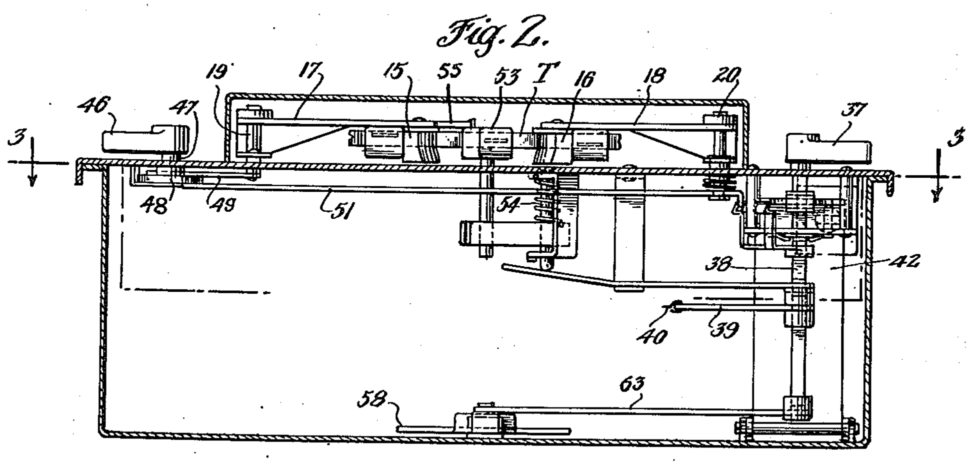
Figure 2 is a vertical sectional view taken as indicated by the section line 2—2 on Figure 1.
Figure 3:
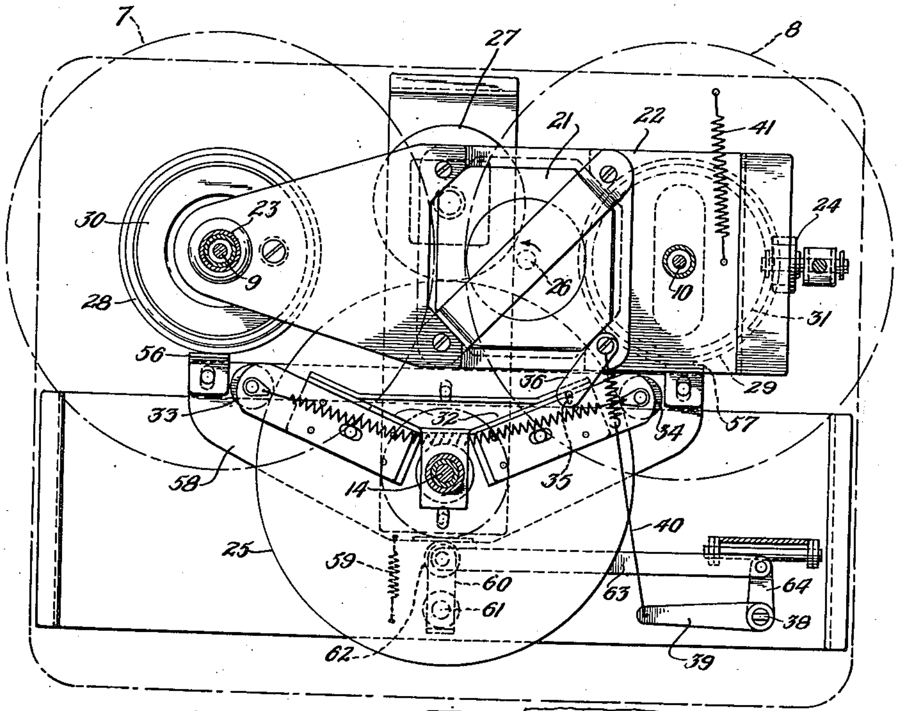
Figure 3 is a plan section taken as indicated by the line 3—3 on Figure 2.

Referring first to Figures 1 to 3 inclusive, as there shown, a pair of tape reels 7 and 8 are provided, these reels being removably mounted on drive spindles 9 and 10. A tape record appears at T, this record being extended in a feed path between the tape reels defined in part by guide posts 11 and 12. A tape driving capstan 13 is arranged adjacent the path of feed of the tape, this capstan being mounted on a drive shaft 14. The tape is adapted to be brought into engagement with the periphery of the capstan 13 by means of guide elements 15 and 16 which are mounted on the arms 17 and 18, pivoted at 19 and 20, respectively. These arms may be swung inwardly to the positions indicated in dot-and-dash lines at 17a and 18a in which it will be seen that the tape is caused to engage a substantial portion of the periphery of the driving capstan 13. The capstan 13 determines the speed of feed of the tape when the arms 17 and 18 are in the positions indicated at 17a and 18a.

The reels 7 and 8 are also adapted to be driven and the drive mechanism for both the reels and the capstan is shown in Figure 3. Here it will be seen that a motor 21 is carried by a supporting structure 22 which is pivoted by means of a sleeve 23 arranged coaxially of the reel drive spindle 9. At the opposite end of the motor support 22 a roller 24 is provided on which the motor support is adapted to ride during pivotal movement of the support in either direction. The capstan driving shaft 14 carries a driving disc 25 with which the motor shaft 26 is adapted to engage when the motor support 22 is swung in one direction. An intermediate or idler disc 27 also engages the capstan driving disc 25, and when the motor support is shifted in a direction away from the capstan driving disc, the motor shaft 26 engages the periphery of the idler 27 and thereby serves to drive the capstan driving disc 25 in the opposite direction.

The reel drive mechanism includes drum members 28 and 29 which are rotatively mounted on the reel shafts 9 and 10 and connected therewith through the slip clutches 30 and 31. A walking beam 32 is pivoted concentrically with the capstan driving shaft 14 and carries idler rollers 33 and 34. Upon rocking movement of the support 32 in one direction the idler 33 is brought into operative interengagement between the capstan driving disc 25 and the driving member 30 for reel spindle 9. When the support 32 is oscillated in the opposite direction, the idler roller 34 is brought into operative driving interengagement between the capstan drive disc 25 and the driving member 29 for the reel spindle 10.

Oscillation of the support 32 for the rollers 33 and 34 is coordinated with shifting movement of the motor support 22 by means of a spring finger 35 which projects downwardly from the arm 36 carried by the motor support and is connected with the idler support 32. In this way when the motor support swings in either direction, the support 32 is caused to oscillate so as to bring one or the other of the rollers 33 and 34 into operative position.

The drive mechanisms above described are adapted to be controlled by means of a manually operable control handle 37 mounted on a control shaft 38. This control shaft carries an arm 39 having a connection 40 with the motor support 22. The motor support is biased in one direction by means of a spring 41 and the control shaft 38 is adapted to be retained in any position of adjustment by means of a latch device indicated at 42. This latch device has three notches (as seen in Figure 1) corresponding to positions of adjustment of the control for forward operation, for reverse operation and for stopping of the tape feed, the non-operating position lying intermediate the other two. The control shaft 38 carries an arm 43 with a roller 44 (see Figure 6) adapted to engage in any one of the three notches of the latch device 42. The latch device is biased toward the control shaft by means of a spring 45 (see Figure 1) and in this way the start-stop control is retained in any one of its three positions of adjustment.

The control for arms 17 and 18 is best seen in Figures 1 and 2. Here it will be seen that an operating handle 46 is mounted on a shaft 47, such shaft carrying a double ended arm 48 to one end of which a link 49 is pivoted. The other end of link 49 is pivoted to a lever 50 moving with the arm 17 about the pivot 19. The other end of the double arm 48 is pivotally connected with a link 51 which extends across the machine for pivotal connection with lever 52 which is fixed for movement with the arm 18 about the pivot 20. Upon adjustment of the handle 46 the arms 17 and 18 are caused to swing between the full line position of Figure 1 and the dot-and-dash line position shown at 17*a* and 18*a*.

This adjustment movement of arm 17 is also utilized to displace the magnetic scanning head 53 from the tape record adjacent the capstan, the head being pivotally mounted for swinging movement about a pivot 54. This displacement of the head 53 is effected by means of a finger 55 carried by the arm 17.

Attention is now called to the fact that the operating position, i. e., effective scanning position of the arms 17 and 18 corresponds to the dot-and-dash positions 17*a* and 18*a* shown in Figure 1. When in this operating position, the engagement of the tape record with the capstan 13 determines the speed of feed between the reels. The drive to the take-up reel is such as to tend to overdrive the take-up reel with relation to the capstan drive, but when the tape is in engagement with the capstan, slippage occurs at the clutch between the reel drive shaft and the reel drive disc. On the other hand when the control 46 is moved to the full line position shown in Figure 1, the tape is disengaged from the capstan 13, and at this time the clutch in the drive to the take-up reel will no longer slip and will therefore effect high speed feed of the tape to the take-up reel.

The mechanism of the machine illustrated further includes brakes for arresting rotation of the tape reels. These brakes are shown at 56 and 57, being mounted on a shiftable plate 58 in position to engage the driving members 28 and 29 for the reel spindles 9 and 10. The brakes are biased to release position by a spring 59 and may be applied by oscillation of arm 60 about the pivot 61. Arm 60 carries a roller 62 adapted to engage a part of the supporting plate 58 for the brakes. Movement of the arm 60 is effected by means of a link 63 pivotally connected with an arm 64 fixed on the control shaft 38. With the parts in the position of adjustment shown in Figures 1 to 4 inclusive, i. e., with the control handle 37 in non-operating or mid position, the reel brakes 56 and 57 are applied. When the control handle 37 is moved to either the forward or the reverse operating position, the reel brakes are released by means of the spring 59.

It is here noted that the general arrangements of the machine described above conform with those of the copending application above identified. While not all details of these parts are described in full herein, reference may be had to said copending application for further details. The general organization of the machine thus far described has been disclosed herein because of the fact that the improved control mechanism of the present invention has a special cooperative relation with various of the features and devices of a machine of this type.

To specifically consider the problem to which the invention is especially directed, assume that the machine shown is operating with the reversing control 37 in either of the operating positions and with the control handle 46 adjusted to the position shown in full lines in Figure 1. At this time the tape will be fed at high speed from one reel to the other (depending upon the adjustment of the control 37). If now the control 46 is actuated to bring the arms 17 and 18 to the dot-and-dash line positions shown at 17*a* and 18*a*, the result will be to engage the tape with the tape driving capstan 13, and in consequence the reel from which the tape is being delivered will continue to spin at high speed and this will result in discharge of a substantial free loop of tape.

Figures 4, 5, 6:
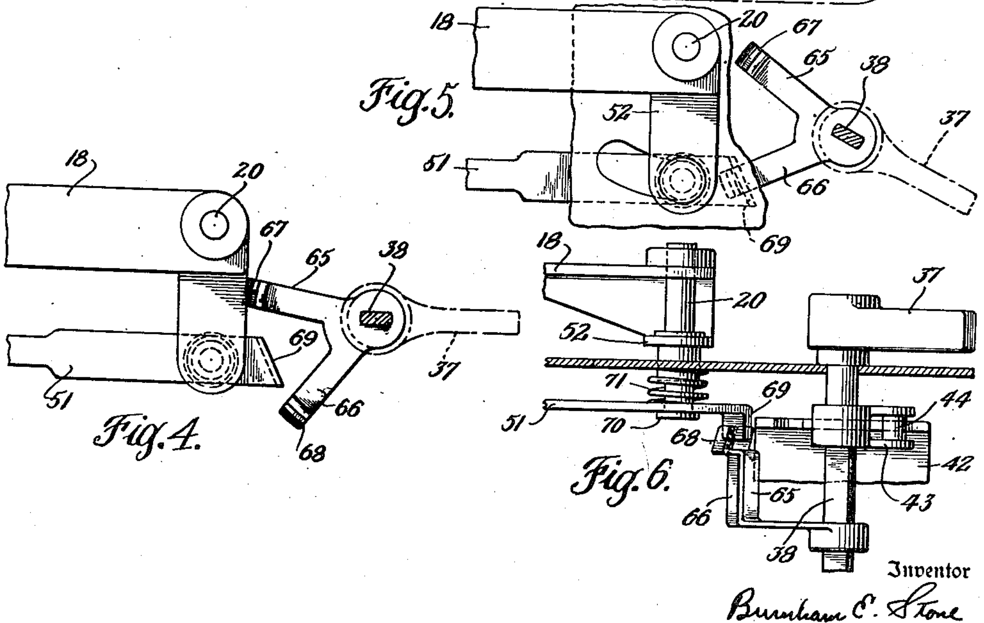
Figure 4 is an enlarged view of certain details of the control mechanism, with the parts thereof shown in the positions of adjustment also illustrated in Figures 1, 2 and 3.
Figure 5 is a view similar to Figure 4 but illustrating a different position of adjustment.
Figure 6 is an elevational view of various of the control parts in the position represented by Figure 5.

With the foregoing difficulties in mind, the present invention provides an interlock between the controls 37 and 46, which interlock prevents operation of control 46 to bring the tape into engagement with the capstan 13 in either of the operating positions of adjustment of the reversing control 37. The mechanism provided for this purpose is best seen in Figures 4, 5 and 6. As there shown, the control shaft 38 carries a pair of arms 65 and 66 the free ends of these arms being bent upwardly as seen in Figure 6 and provided with catch parts 67 and 68. The link 51 which is connected with the control 46 has a latch part 69 adapted to cooperate with either of the catch parts 67 and 68. The catches are so located angularly about control shaft 38 that in one operating position one of the catches is brought into the path of movement of latch 69, and in the other operating position the other catch is brought into the path of movement of the latch 69. Thus, as seen in Figures 5 and 6, the latch 69 is in engagement with the catch 68 and this prevents movement of control 46 to swing the arms 17 and 18 inwardly. When the control 37 is adjusted to the intermediate, non-operating position (see Figure 4), the catches 67 and 68 are both displaced out of the path of the latch 69, and at this time the control 46 may be freely moved in either direction. It will be noted, however, that at this time the motor drive shaft 26 is disengaged and the mechanisms for driving the reels and capstan are disabled. The tape is therefore standing idle.

In this intermediate or neutral setting, the brakes 56 and 57 are also applied to the reels and in view of this it will be seen that the control mechanism of the invention also provides interlock as between the action of the reel brakes and the action of the control 46 for regulating the speed of feed of the tape. Specifically, it will be seen that the control 46 cannot be moved to bring the tape against the driving capstan 13 at any time when the reel brakes are released. This is also of importance in avoiding undesirable development or discharge of a free loop of tape.

As seen in Figure 6, the pivotal connection 70 between the arm 52 and the link 51 provides freedom for vertical movement of the link 51, such movement preferably being resisted by a spring 71. This freedom for movement of the link 51 and of the associated latch 69 permits the link 51 to be moved toward the right when viewed as in Figure 6 regardless of the position of adjustment of the control shaft 38. This is a desirable operating feature, since the control 46 is thus movable from the low speed setting to the high speed setting at any time, thereby facilitating a desired rewinding operation.

Attention is called to the fact that the latch part 69 has its effective latching surface formed on an angle to the link 51. The angle is such as to avoid transmission of a force from the link 51 to the control shaft 38 tending to rotate the control shaft. For this purpose the line of the effective latch surface of the latch 69 is tangent to a circle concentric with the control shaft 38. Because of this arrangement, even if a force is applied to the control handle 46 when the latch part 69 is in engagement with either of the catch parts 65 and 66, there will be no tendency to shift the position of adjustment of the reversing control lever 37.

I claim:

1. In equipment having a pair of reels between which an elongated record is adapted to be fed, means for feeding a record from one reel to the other alternatively at a normal scanning speed and at a higher speed, a control for starting and stopping record feed, a control for changing the record feed speed between said normal scanning speed and said higher speed, and mechanism interlocking operation of said controls and providing against adjustment of the speed control from the higher speed setting to the scanning speed setting when the start-stop control is in record-feed position.

2. A construction according to claim 1 in which the speed control is adjustable to the higher speed setting with the start-stop control in either record-feed or stop position.

3. A construction according to claim 1 and further including a brake for the reel from which a record is fed and brake operating mechanism interlocked in operation with the start-stop control and providing for application of the brake in stop position of adjustment of the start-stop control and for release of the brake in record-feeding position of adjustment.

4. In equipment having a pair of reels between which an elongated record is adapted to be fed, means for feeding a record from one reel to the other, an adjustably movable record guide adjacent the path of feed of a record between the reels having a position of adjustment providing for normal scanning of a record at a relatively low speed and a position providing for feed of a record at higher speed, an adjustable control having a position of adjustment in which the record feed is stopped and a position of adjustment corresponding to normal operation, and mechanism interrelating adjustment movement of said guide and of said control and providing against adjustment of the guide from the high speed setting to the low speed setting when said control is adjusted to the normal operating setting.

5. In equipment having a pair of reels between which an elongated record is adapted to be fed, means for feeding a record from one reel to the other, a releasable brake for the reel from which a record is fed, a control for changing the speed of the record take-up reel, and mechanism interrelating the operation of the brake and of said control and providing against adjustment of the control to retard the speed of the record take-up reel when the brake is released.

6. A construction according to claim 5 and further including a start-stop control for record feed coordinated in operation with the operation of said brake and providing for stopping of record feed when the brake is applied and for feed of a record when the brake is released.

7. In equipment having a pair of reels between which an elongated magnetic record is adapted to be fed, means for feeding a record from one reel to the other, a record driving member adapted to engage a record in its path of feed between the reels, adjustable mechanism for engaging and disengaging a record with reference to the driving member and providing for change in speed of record feed between a relatively low speed when the record is in engagement with the driving member and a relatively high speed when the record is disengaged from the driving member, a start-stop control for record feed, and an interlock between said adjustable mechanism and said control providing against adjustment of said mechanism to effect engagement of a record with the driving member when the start-stop control is adjusted to operating position.

8. A construction according to claim 7 in which the start-stop control has three positions of adjustment one of which provides for record feed in one direction, another for record feed in the opposite direction and the third of which is a non-operating position, and in which the interlock between said adjustable mechanism and said control provides against adjustment of said mechanism to effect engagement of a record with the driving member when said control is in either forward or reverse operating position.

9. A construction according to claim 8 in which said adjustable mechanism is movable to disengage a record from the driving member when said control is in either forward or reverse operating position.

10. In equipment having a pair of reels between which an elongated magnetic record is adapted to be fed, means for feeding a record from one reel to the other, a record driving member adapted to engage a record in its path of feed between the reels, adjustable mechanism for engaging and disengaging a record with reference to the driving member and providing for change in speed of record feed between a relatively low speed when the record is in engagement with the driving member and a relatively high speed when the record is disengaged from the driving member, a releasable reel brake, and an interlock between said adjustable mechanism and said brake providing against adjustment of said mechanism to effect engagement of a record with the driving member when the reel brake is released.

11. In equipment having a pair of reels between which an elongated record is adapted to be fed, means for feeding a record from one reel to the other, a start-stop control, a control for effecting high and low speed record feed, and an interlock between said controls providing against adjustment of the speed control from one position to the other when the start-stop control is in operating position.

12. A construction according to claim 11 in which the interlock comprises a latch device providing freedom for movement of the speed control when the start-stop control is in the stop position.

13. In equipment having a pair of reels between which an elongated record is adapted to be fed, means for feeding a record from one reel to the other, a start-stop control, a control for effecting high and low speed record feed, and an interlock between said controls providing against adjustment of the speed control from one position to the other when the start-stop control is in operating position, comprising interengageable latch and catch parts respectively associated with said controls and movable into engagment with each other but providing against separation thereof except by displacement of one out of the path of the other.

14. In equipment having a pair of reels between which an elongated record is adapted to be fed in either direction, means for feeding a record from one reel to the other, a start-stop control having three positions of adjustment one of which provides for record feed in one direction, another for record feed in the opposite direction and the third a non-operating position intermediate the two operating positions, a control for effecting high and low speed record feed, and an interlock between said controls providing against adjustment of the speed control from high speed setting to low speed setting when the start-stop control is in either operating position.

15. A construction according to claim 14 in which the interlock comprises a latch part associated with the speed control and a pair of cooperating catch parts associated with the start-stop control and respectively movable into the path of the latch part upon adjustment of the start-stop control to either of its operating positions.

16. In equipment having a pair of reels from one to the other of which an elongated magnetic record is adapted to be fed, a record driving member engageable with a record in its path of feed between the reels to drive the record toward said other reel at a relatively low speed, control means shiftable in a given direction to effect engagement of the record with respect to the driving member, reel drive means operable to urge said other reel to rotation at a velocity corresponding to relatively high record speed, a second control means manually shiftable into a stop position in which said reel drive means is inoperative, and an interlock between said two control means blocking the shifting of said first control means in said given direction until after shifting of said second control means into stop position.

BURNHAM E. STONE.

References Cited in the file of this patent

UNITED STATES PATENTS

| Number | Name | Date |
|---|---|---|
| 708,724 | Merrick et al. | Sept. 9, 1902 |
| 748,156 | Bement | Dec. 29, 1903 |
| 1,070,936 | Aalborg | Aug. 19, 1913 |
| 1,203,048 | Rastetter | Oct. 31, 1916 |
| 1,497,569 | Klausmeyer | June 16, 1924 |
| 1,845,462 | Wellman | Feb. 16, 1932 |
| 2,396,787 | Hawthorne et al. | Mar. 19, 1946 |
| 2,408,320 | Kuhlik | Sept. 24, 1946 |
| 2,409,762 | Jones | Oct. 22, 1946 |
| 2,419,476 | Begun | Apr. 22, 1947 |
| 2,467,507 | Stone | Apr. 19, 1949 |
| 2,540,299 | Shoup et al. | Feb. 6, 1951 |